US010329954B2

(12) United States Patent
Race et al.

(10) Patent No.: US 10,329,954 B2
(45) Date of Patent: Jun. 25, 2019

(54) FLOW STRAKES FOR TURBOCHARGER BEARING HOUSING OIL CORE

(71) Applicant: BorgWarner Inc., Auburn Hills, MI (US)

(72) Inventors: Robert Thomas Race, Arden, NC (US); Erwin Perry Ellwood, III, Candler, NC (US); Jonathan Williams, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 485 days.

(21) Appl. No.: 15/099,215

(22) Filed: Apr. 14, 2016

(65) Prior Publication Data

US 2017/0298771 A1 Oct. 19, 2017

(51) Int. Cl.
| | |
|---|---|
| F01D 25/18 | (2006.01) |
| F01D 5/02 | (2006.01) |
| F01D 25/16 | (2006.01) |
| F02B 33/40 | (2006.01) |
| F04D 29/28 | (2006.01) |
| F16C 33/66 | (2006.01) |
| F16C 35/04 | (2006.01) |
| F01D 25/32 | (2006.01) |
| F02B 39/14 | (2006.01) |
| F16C 35/02 | (2006.01) |

(Continued)

(52) U.S. Cl.
CPC .............. *F01D 25/18* (2013.01); *F01D 5/02* (2013.01); *F01D 25/162* (2013.01); *F01D 25/32* (2013.01); *F02B 33/40* (2013.01); *F02B 39/14* (2013.01); *F04D 29/284* (2013.01); *F16C 33/106* (2013.01); *F16C 33/1045* (2013.01); *F16C 33/6637* (2013.01); *F16C 35/02* (2013.01); *F16C 35/042* (2013.01); *F16C 37/00* (2013.01); *F05D 2220/40* (2013.01); *F05D 2260/602* (2013.01); *F05D 2260/98* (2013.01); *F16C 2360/24* (2013.01)

(58) Field of Classification Search
CPC ........ F01D 25/18; F01D 25/162; F01D 25/32; F02B 33/40; F02B 39/14; F04D 29/284; F16C 33/1045; F16C 33/106
USPC ....................................................... 415/111
See application file for complete search history.

(56) References Cited

U.S. PATENT DOCUMENTS

| 4,784,586 A | 11/1988 | Ho |
| 5,483,791 A | 1/1996 | Kotwal |

(Continued)

*Primary Examiner* — Timothy L Maust
(74) *Attorney, Agent, or Firm* — Miller, Matthias & Hull LLP (57) ABSTRACT

A bearing housing for a turbocharger is disclosed. The bearing housing includes a first end proximate to a turbine wheel of the turbocharger and a second end proximate to a compressor wheel of the turbocharger. The bearing housing further includes a central chamber disposed between the first end and the second end and configured to house, at least, the shaft. The bearing housing further includes an oil drain disposed radially outward of the shaft and configured for directing oil out of the bearing housing and an oil core disposed radially outward of the shaft and radially inward of the oil drain, the oil core configured for communicating oil towards the oil drain and having an inner wall. The bearing housing includes one or more strakes protruding radially inward from the inner wall, the one or more strakes configured to direct oil within the oil core towards the oil drain.

9 Claims, 5 Drawing Sheets

(51) Int. Cl.
*F16C 37/00* (2006.01)
*F16C 33/10* (2006.01)

(56) References Cited

U.S. PATENT DOCUMENTS

| | | | |
|---|---|---|---|
| 6,032,466 A * | 3/2000 | Woollenweber | F01D 25/164 |
| | | | 417/407 |
| 7,670,056 B2 | 3/2010 | Petitjean et al. | |
| 8,356,695 B2 | 1/2013 | Scuffham et al. | |
| 8,490,982 B2 | 7/2013 | Roche et al. | |
| 8,845,271 B2 * | 9/2014 | Woollenweber | F01D 25/16 |
| | | | 384/277 |
| 9,897,097 B2 * | 2/2018 | Begin | F04D 29/056 |
| 2008/0087018 A1 * | 4/2008 | Woollenweber | F01D 25/16 |
| | | | 60/605.3 |
| 2013/0142679 A1 | 6/2013 | Hornbach | |
| 2013/0156357 A1 | 6/2013 | Peterson | |
| 2013/0180242 A1 | 7/2013 | Lancaster | |
| 2014/0077631 A1 | 3/2014 | Watanabe | |
| 2015/0167543 A1 | 6/2015 | Takata | |
| 2015/0369081 A1 * | 12/2015 | Takabatake | F02B 39/14 |
| | | | 415/111 |

\* cited by examiner

FLOW STRAKES FOR TURBOCHARGER BEARING HOUSING OIL CORE

TECHNICAL FIELD

The present disclosure generally relates to turbochargers for engines and, more particularly, to oil distribution systems and apparatus within bearing housings in such turbochargers.

BACKGROUND

Turbochargers used with engines, such as internal combustion engines, generally deliver compressed air to an engine intake. The compressed air allows more fuel to be combusted and, thus, boosts an engine's horsepower without significantly increasing the size of the engine. As such, turbochargers allow for smaller engines to produce similar horsepower as larger, alternative, non-turbocharged engines. Furthermore, using a turbocharger reduces fuel usage by providing more complete combustion of the fuel delivered to the engine.

In general, a turbocharger, typically, includes a turbine connected to an exhaust of the engine, a compressor connected to the engine's air intake, a bearing housing disposed between the turbine and compressor, and a shaft housed by the bearing housing and connecting the turbine and compressor. The turbine is driven by an inflow of exhaust gas supplied by the engine. The shaft, rotatably supported by the bearing housing, connects the rotating turbine to the compressor, such that rotation of the turbine causes rotation of the compressor. As the compressor rotates, it increases the air mass flow rate, airflow density, and/or air pressure delivered to cylinders of the engine, via the engine's air intake.

While the rotation speed of the turbine and compressor depend upon sizes of wheels of both the turbine and compressor, in general, the turbine wheel and, in turn, the shaft of a turbocharger rotate at very fast rates. For example, a turbocharger turbine wheel and shaft used in conjunction with an internal combustion engine can reach circumferential speeds of over 500 meters per second. Furthermore, as said turbochargers are often used in engines, they are, therefore, exposed to high temperature environments caused by combustion within the engine. Heat caused by both the engine environment and friction from the high rotational speeds may cause undesired heat along the shaft and, more generally, within the bearing housing. As such, to combat excess heat, combat excess friction, and/or to properly cool the bearing housing, conventional turbochargers, generally, include oil lubrication and cooling systems to properly lubricate and cool the shaft and bearing housing.

In such an oil-lubricated turbocharger, oil is pumped to the shaft to provide necessary lubrication and cooling. However, oil must be continuously pumped into and removed from the bearing housing, as excessive oil build-up within the bearing housing may cause leakage through seals into one or both of the turbine and compressor. Further, if oil remains in the bearing housing for too long of a time, it can degrade due to overheating and may, in some circumstances, form coke. In general, oil may flow away from the bearing housing due to gravity, rather than by using a pump. For example, in an automotive turbocharger, oil may exit the bearing housing and flow to an engine oil sump, wherein the oil is cooled and then recirculated to lubricate one or both of the engine and the turbocharger.

To help improve oil flow within the bearing housing of a turbocharger, various systems and methods are implemented, such as those described in U.S. Patent Application Publication No. 2013/0142679 ("Exhaust-Gas Turbocharger"). In the '679 publication, bearing bushes of the housing may include an oil collecting chamber arranged to delimit a gap and prevent oil from entering a turbine section of the turbocharger. While such chambers certainly may be useful in oil flow, they do not account for oil swirling in the drain and oil build up from improper flow. Therefore, a turbocharger bearing housing, which includes an oil core that improves oil flow to a drain, is desired.

SUMMARY

In accordance with one aspect of the disclosure, a bearing housing for a turbocharger is disclosed. The turbocharger may include a turbine wheel, a compressor wheel, and a shaft rotatably connecting the turbine wheel and the compressor wheel. The bearing housing may include a first end proximate to the turbine wheel and a second end proximate to the compressor wheel. The bearing housing may further include a central chamber disposed between the first end and the second end and configured to house, at least, the shaft. The bearing housing may further include an oil drain disposed radially outward of the shaft and configured for directing oil out of the bearing housing. The bearing housing may further include an oil core disposed radially outward of the shaft and radially inward of the oil drain, the oil core configured for communicating oil towards the oil drain and having an inner wall. The bearing housing may further include one or more strakes protruding radially inward from the inner wall of the oil core, the one or more strakes configured to direct oil within the oil core towards the oil drain.

In accordance with another aspect of the disclosure, a turbocharger is disclosed. The turbocharger may include a turbine wheel, a compressor wheel, and a shaft rotatably connecting the turbine wheel and the compressor wheel. The turbocharger may further include a bearing housing rotatably housing the shaft and configured for distributing oil about the shaft. The bearing housing may include an oil core disposed radially outward of the shaft and configured for communicating oil to an oil drain of the bearing housing. The oil core may have an inner wall and the inner wall may define one or more strakes protruding from the inner wall in a radially inward direction. The one or more strakes may be configured to direct oil within the oil core towards the oil drain, the oil drain being disposed radially outward of the oil core, receiving oil from the oil core, and directing oil out of the bearing housing.

In accordance with yet another aspect of the disclosure, an oil distribution system for a bearing housing of a turbocharger is disclosed. The turbocharger may include a turbine wheel, a compressor wheel, and a shaft rotatably connecting the turbine wheel and the compressor wheel. The system may include an oil inlet for communicating oil into the bearing housing, an oil channel for distributing oil through the bearing housing, and an oil drain for communicating oil out of the bearing housing. The system may further include an oil core for communicating oil to the oil drain, the oil core having an inner wall and a drain opening. The system may further include one or more strakes protruding radially inward from the inner wall of the oil core, the one or more strakes configured to direct oil within the oil core towards the oil drain.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
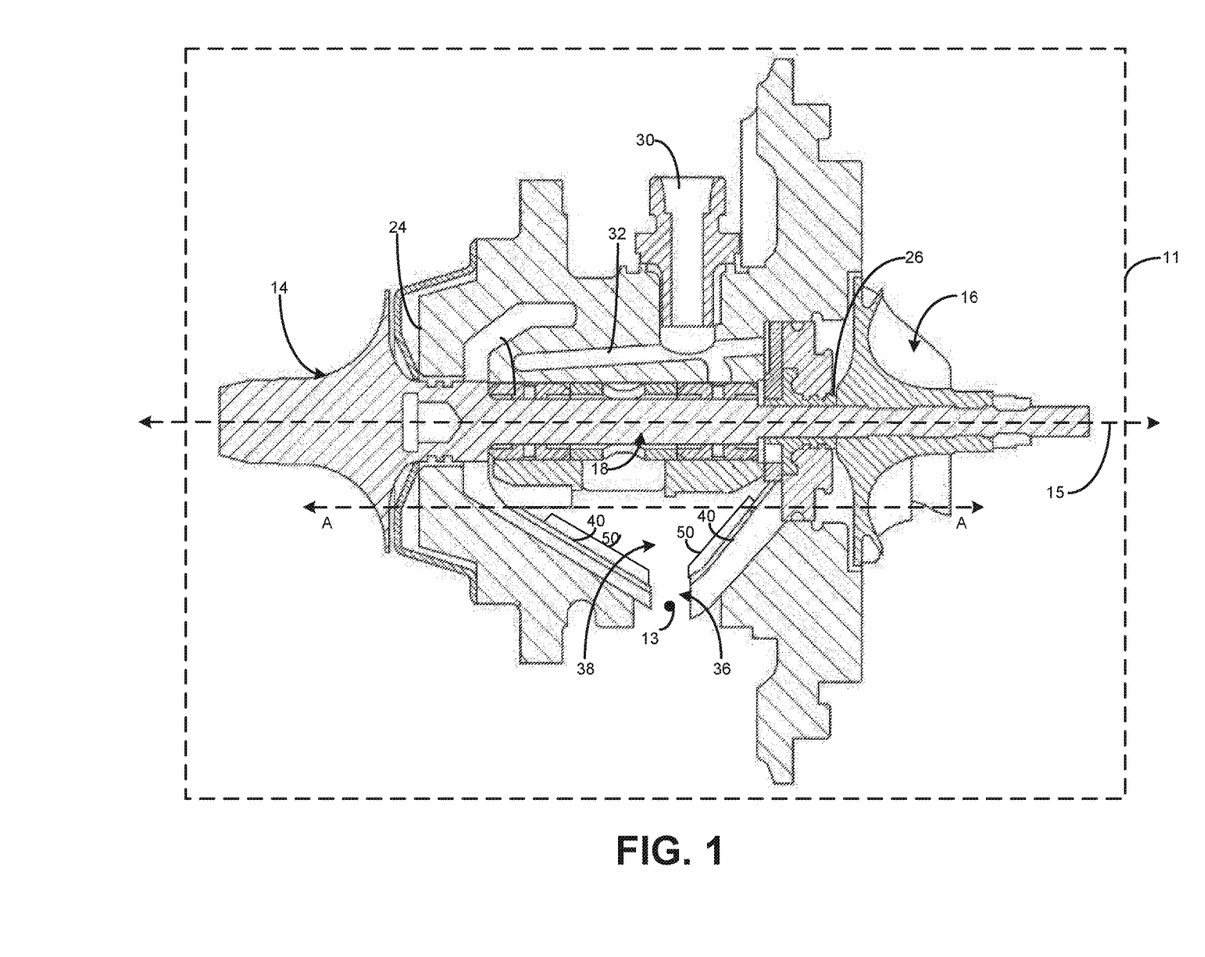
FIG. 1 is a side, cross-sectional view of a turbocharger having the cross-section taken about a strake plane, in accordance with an embodiment of the present disclosure.

Referring now to the drawings and with specific reference to FIG. 1, an example turbocharger 10, including an oil distribution system 12 and constructed in accordance with the present disclosure, is shown. As depicted in FIG. 1, the turbocharger 10 is shown cross-sectional view, wherein the cross-section may be taken and viewed from the reference of a strake plane 11. The strake plane 11 may be formed by three points on or proximate to the turbocharger 10, such as, but not limited to, a drain point 13 and two points along a central axis 15 of the turbocharger 10.

The turbocharger may include a turbine wheel 14 rotatably connected to a compressor wheel 16 via a shaft 18. In some examples, the turbine wheel 14, the compressor wheel 16, the shaft 18, and a bearing housing 20 may be arranged along the central axis 15. The shaft 18 may, generally, pass through the bearing housing 20 and, more particularly, pass through the bearing housing 20 at a central chamber 22 of the bearing housing 20. The central chamber 22 may be disposed, within the bearing housing 20, between a first end 24 of the bearing housing 20 and a second end 26 of the bearing housing 20. The first end may be generally proximate to the turbine wheel 14, while the second end 26 may be generally proximate to the compressor wheel 16.

For distributing oil throughout the bearing housing 20, the oil distribution system 12 of the turbocharger 10 may include an oil inlet 30, which may communicate oil into the bearing housing 20 from a source outside of the turbocharger 10 (e.g., new oil from an oil source of the engine, redistribution of oil from an oil source of the engine, etc.). Oil entering the oil inlet 30 may flow to one or more oil channels 32, through which the oil is distributed through the bearing housing and, specifically, provided to the shaft 18 and any associated bearings 34. Once the oil has passed through the central chamber 22, lubricated the shaft 18 and bearings 34, it may flow to an oil drain 36, through which it may exit the bearing housing 20 and enter other elements of an engine associated with the turbocharger 10 (e.g., an oil sump of an engine (not shown)).

Prior to reaching the oil drain 36, the oil may flow, in the general direction of and via the force of gravity, through an oil core 38 disposed radially outward of the shaft 18 yet radially inward of the oil drain 36. The oil core 38 may be configured for communicating oil towards the oil drain 36. As oil may travel through the oil core 38 by being propelled by gravitational forces, the oil core 38 may be, therefore, disposed radially outward of the central axis 15 in the general direction of gravitational forces.

Figure 2:
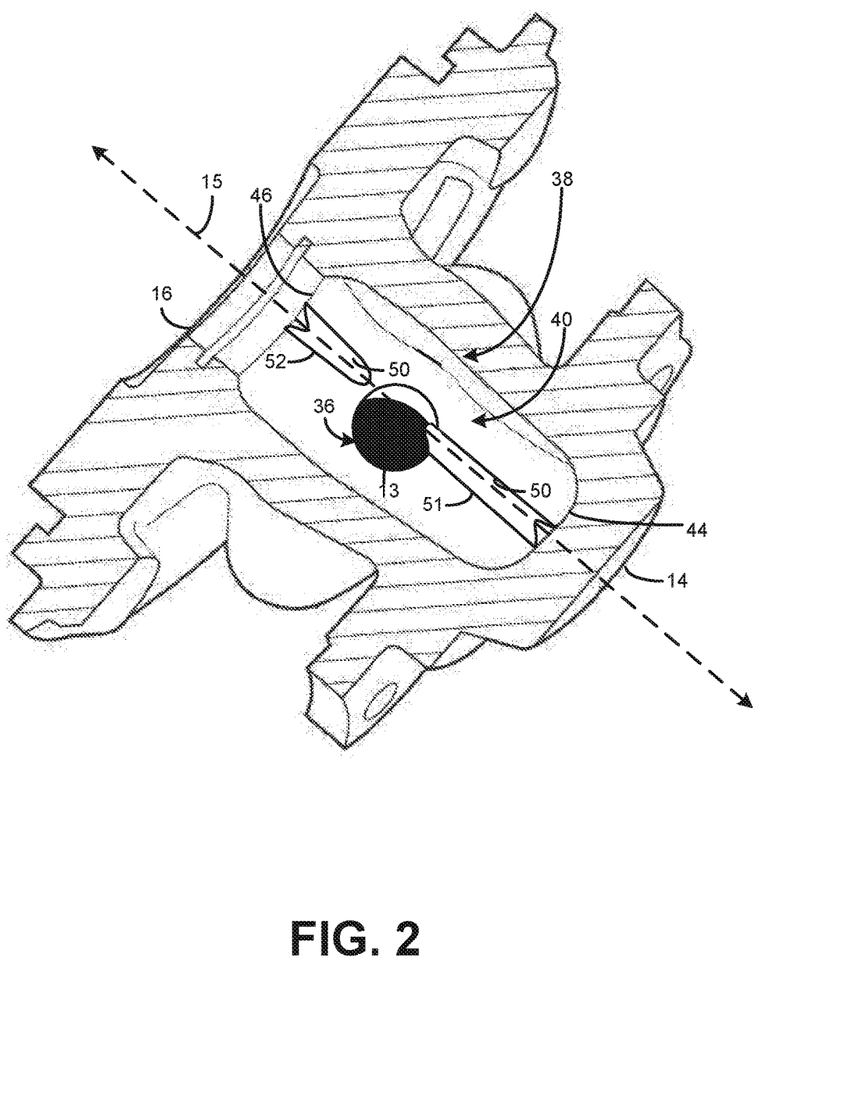
FIG. 2 is a three-dimensional, partially cross-sectional view of a portion of a bearing housing, taken along a line A-A, of the turbocharger of FIG. 1, the bearing housing including one or more strakes, in accordance with an embodiment of the present disclosure.

The oil core 38 is further illustrated in the three-dimensional, cross-sectional view of FIG. 2, wherein the cross section is taken about the line A-A, and a plane formed therefrom, and represents approximately a lower 30% of the bearing housing 20. With respect to FIG. 2 and in continued reference to FIG. 1, the oil core 38 has an inner wall 40, along which oil may flow downward towards the oil drain 36. As shown, the inner wall 40 may be a generally funnel shaped inner wall 40, which aides in the gravitational flow of oil towards the oil drain 36. The inner wall 40 may include a turbine end 44, generally proximate to the turbine wheel 14 and the first end 24, and a compressor end 46, generally proximate to the compressor wheel 16 and the second end 26.

To further aid in directing oil towards the oil drain 36, the bearing housing 20 may include one or more strakes 50 configured to direct oil, within the oil core 38, towards the oil drain 36. The one or more strakes 50 may protrude radially inward from the inner wall 40 of the oil core 38. As such, the one or more strakes 50 may be defined by the inner wall 40 of the oil core 38. When oil enters the oil core 38, it may interact with the one or more strakes 50, such that the strakes prevent swirling in the oil core 38, which may occur when utilizing a funnel shaped inner wall 40. Further, by directing the oil towards the drain 36, the one or more strakes 50 may prevent oil leakage from the bearing housing 20 into one or both of the turbine wheel 14 and the compressor wheel 16.

Referring again to FIG. 2 and with continued reference to FIG. 1, the one or more strakes 50 may be arranged with respect to the strake plane 11. As defined above, the strake plane 11 may be defined by three points in proximity of the turbocharger 10, like, for example, two points proximate to or on the central axis 15 and a drain point 13 proximate to the oil drain 36. As such, the one or more strakes, as shown in FIG. 2, may protrude radially inward from the inner wall 40 in a general direction and alignment of the strake plane 11, which contains the central axis 15, or any parallel plane of the strake plane 11. As shown in FIG. 2, the one or more strakes 50 may include a first strake 51 and a second strake 52. The first strake 51 may extend, generally, about the strake plane 11 from the turbine end 44 of the inner wall towards the oil drain 36. Further, the second strake 52 may extend, generally, about the strake plane 11, from the compressor end 46 towards the oil drain 36. The first strake 51 and the second strake 52 may be particularly useful in directing oil away from the turbine wheel 14 and the compressor wheel 16. While the first and second strakes 51, 52 are shown, any number of strakes other than the first and second strakes 51, 52 in any configuration are certainly possible.

Figure 3:
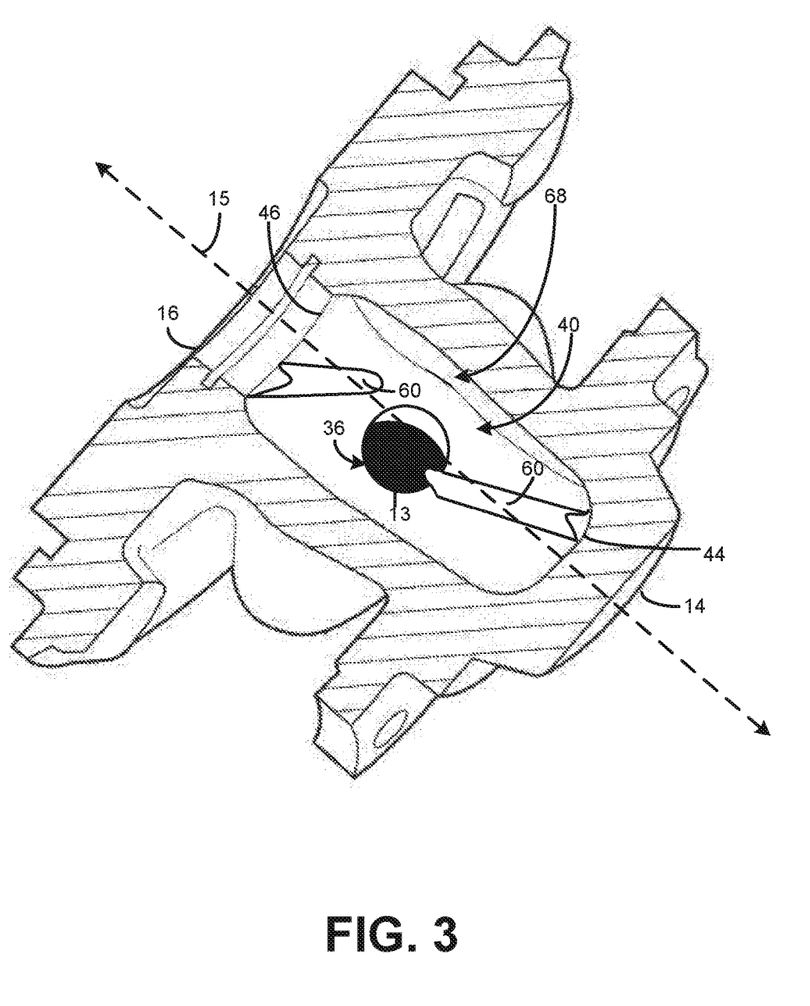
FIG. 3 is a three-dimensional, partially cross-sectional view of a portion of a bearing housing, taken along a line A-A, of the turbocharger of FIG. 1, the bearing housing including one or more angled strakes, in accordance with an embodiment of the present disclosure.

To that end, FIG. 3 shows an alternative embodiment of an oil core 68 for the bearing housing 20 of the turbocharger 10 which may have one or more angled strakes 60 protruding therefrom. As shown, the angled strakes may be angled with respect to the strake plane 11. However, the angled strakes may be angled at any suitable angle or in any suitable configuration for directing oil towards the oil drain 36. Further, angled strakes 60 may be particularly useful in preventing oil swirling within the oil drain 36.

Figure 4:
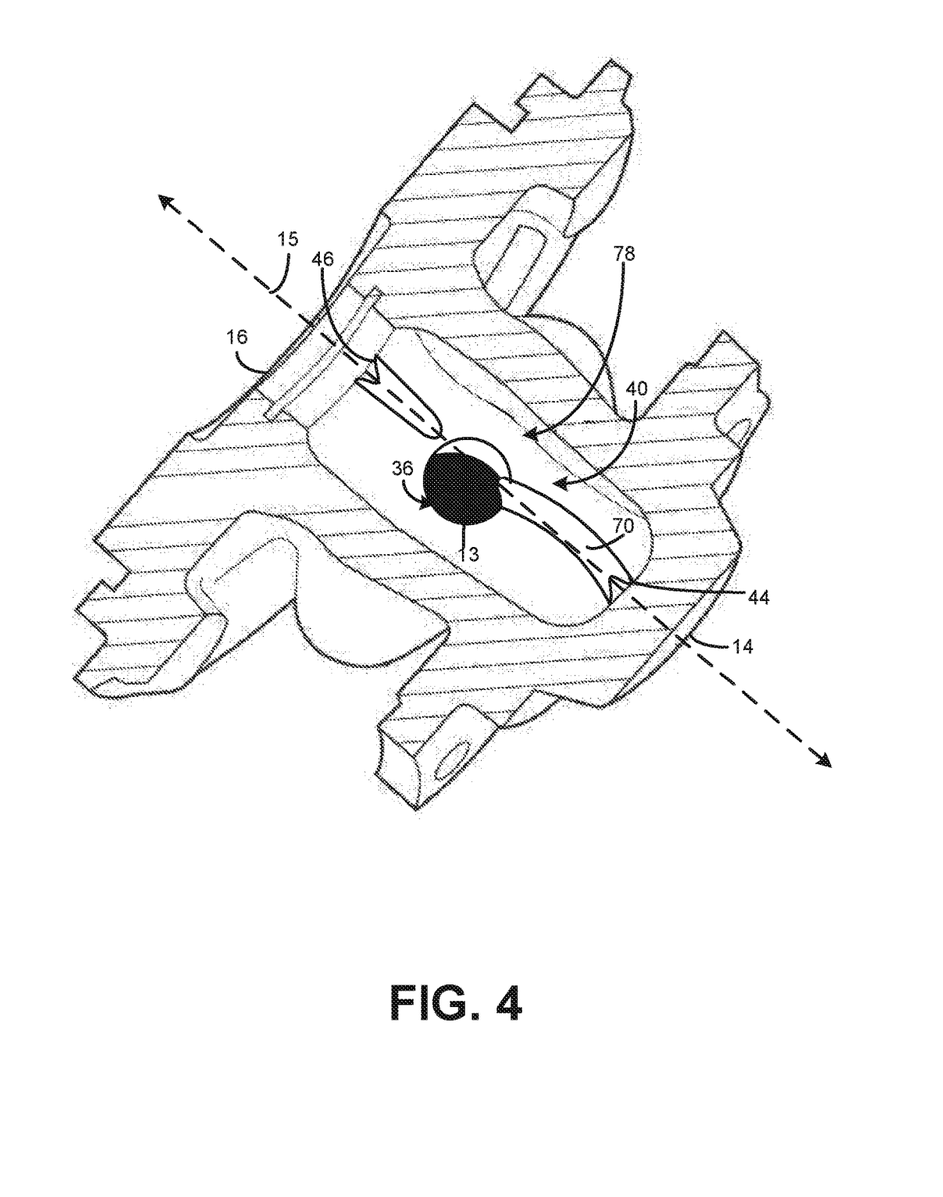
FIG. 4 is a three-dimensional, partially cross-sectional view of a portion of a bearing housing, taken along a line A-A, of the turbocharger of FIG. 1, the bearing housing including one or more curved strakes, in accordance with an embodiment of the present disclosure.
Figure 5:
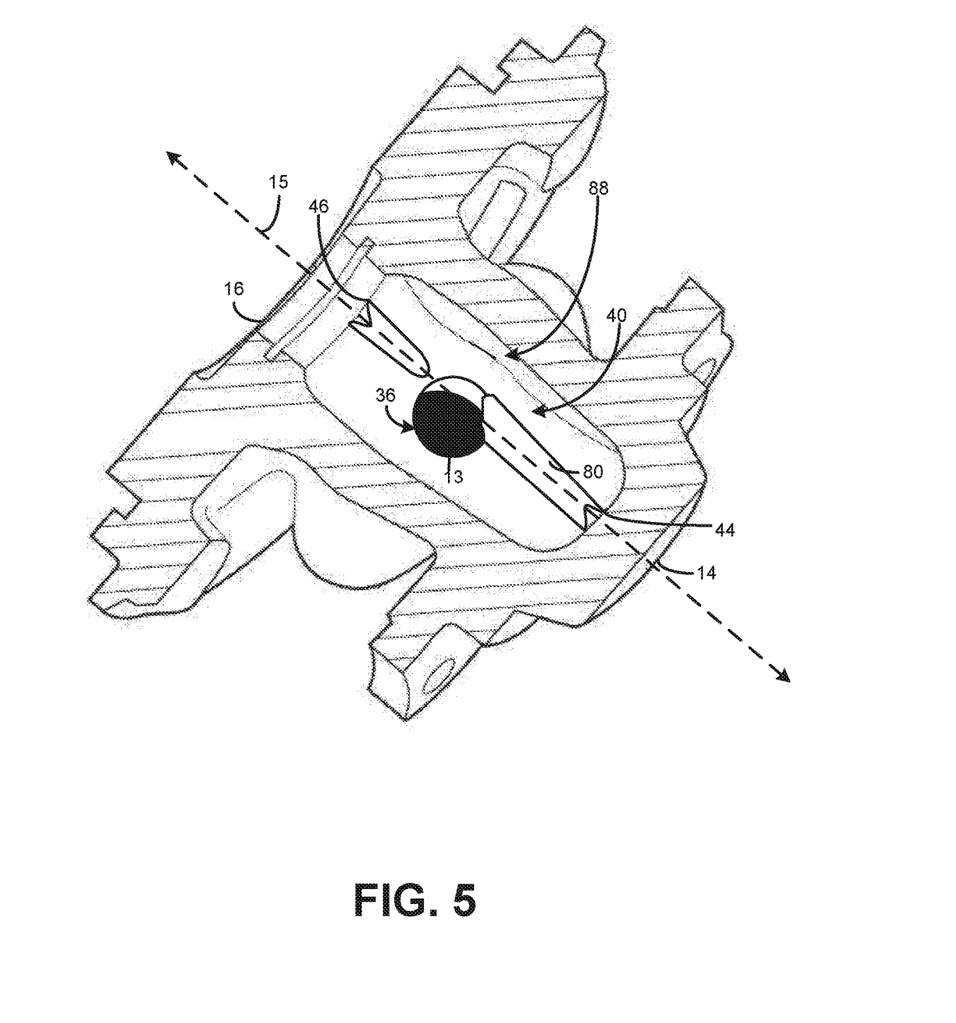
FIG. 5 is a three-dimensional, partially cross-sectional view of a portion of a bearing housing, taken along a line A-A, of the turbocharger of FIG. 1, the bearing housing including one or more strakes having an increasing height, in accordance with an embodiment of the present disclosure.

In another alternative embodiment of an oil core 78 for the bearing housing 20 of the turbocharger 10, one or more curved strakes 70 may be provided. The curved strakes 70 may be curved in any suitable form or fashion for directing oil from the oil core 78 to the oil drain 36. For example, the curved strakes 70 may be particularly curved to intercept swirling oil within the oil core 78. Additionally or alternatively, the curved strakes 70 may be configured to curve in a fashion which allows the oil to follow curvature of the curved strakes 70 into the oil drain 36, effectively guiding the oil towards the oil drain 36 and out of the bearing housing 20.

In yet another embodiment of an oil core 88 for the bearing housing 20 of the turbocharger 10, one or more strakes 80 may be provided, which have a height that increases in height, towards the oil drain 36, along the general direction of the strake plane 11. By including one or more strakes 80 having increasing height, swirling may be prevented even further, as oil build up cannot extend over the strakes 80 as it enters the end of the funnel shaped inner wall 40. Of course, while the embodiments of FIG. 2-5 are shown in separate oil cores 38, 68, 78, 88, any of the strakes 50, 60, 70, 80 may be implemented in conjunction with one another within any oil core 38, 68, 78, 88 for the purposes of directing fuel towards the oil drain 36.

INDUSTRIAL APPLICABILITY

In general, the present disclosure may find applicability in many industries, for example the automotive industry and, more particularly, turbochargers for combustion engines. In that regard, the present disclosure generally relates to turbochargers and, more particularly, to oil distribution systems and apparatus within bearing housings for turbochargers.

As discussed above, utilizing any combination of strakes 50, 60, 70, 80 may be particularly useful in guiding oil through the oil core 38 towards the oil drain 36 to properly vacate oil from the bearing housing 20. By effectively, efficiently, and quickly removing the oil from the bearing housing 20, using the disclosed systems and apparatus, fuel swirling may be prevented within the oil core 38. Additionally, any of the strakes 50, 60, 70, 80 may effectively direct oil away from one or both of the turbine wheel 14 and the compressor wheel 16, which may prevent oil leakage into the turbine wheel 14 and/or the compressor wheel 16. Further, as the strakes 50, 60, 70, 80 may aid in speeding up oil removal within the oil core, utilization of the systems and apparatus of the present disclosure may prevent oil degradation due to overheating and may also prevent coke formation within the oil core.

It will be appreciated that the present disclosure provides turbochargers, bearing housings for turbochargers, and oil distribution systems for turbochargers. While only certain embodiments have been set forth, alternatives and modifications will be apparent from the above description to those skilled in the art. These and other alternatives are considered equivalents and within the spirit and scope of this disclosure and the appended claims.

What is claimed is:

1. A bearing housing for a turbocharger, the turbocharger including a turbine wheel, a compressor wheel, and a shaft rotatably connecting the turbine wheel and the compressor wheel, the bearing housing comprising:
    a first end proximate to the turbine wheel;
    a second end proximate to the compressor wheel;
    a central chamber disposed between the first end and the second end and configured to house, at least, the shaft;
    an oil drain disposed radially outward of the shaft configured for directing oil out of the bearing housing;
    an oil core disposed radially outward of the shaft and radially inward of the oil drain, the oil core configured for communicating oil towards the oil drain and having an inner wall; and
    one or more strakes protruding radially inward from the inner wall of the oil core, the one or more strakes configured to direct oil within the oil core towards the oil drain;
    at least two of the strakes oriented generally parallel to the shaft, and extending in opposed directions; and
    wherein the strakes avoid swirling of the oil as the oil flows towards the oil drain.

2. The bearing housing of claim 1, wherein the inner wall of the oil core is a generally funnel shaped wall and the one or more strakes protrude from the generally funnel shaped wall.

3. The bearing housing of claim 1, wherein the one or more strakes extend in a general direction of a strake plane, the strake plane formed by, at least, two points on a center axis of the turbocharger and a point proximate to the oil drain.

4. The bearing housing of claim 3, wherein at least one of the one or more strakes are angled with respect to the strake plane.

5. The bearing housing of claim 1, wherein the one or more strakes are curved strakes.

6. The bearing housing of claim 1, wherein the one or more strakes includes a first strake extending, generally, from a turbine end of the inner wall towards the oil drain, the turbine end proximate to the first end.

7. The bearing housing of claim 1, wherein the one or more strakes includes a second strake extending, generally, from a compressor end of the inner wall towards the oil drain, the compressor end proximate to the second end.

8. An oil distribution system for a bearing housing of a turbocharger, the turbocharger including a turbine wheel, a compressor wheel, and a shaft rotatably connecting the turbine wheel and the compressor wheel, the system comprising:
    an oil inlet for communicating oil into the bearing housing;
    an oil channel for distributing oil through the bearing housing;
    an oil drain for communicating oil out of the bearing housing;
    an oil core for communicating oil to the oil drain, the oil core having an inner wall and a drain opening; and one or more strakes protruding radially inward from the inner wall of the oil core, the one or more strakes configured to direct oil within the oil core towards the oil drain;

at least two of the strakes oriented generally parallel to the shaft, and extending in opposed directions; and wherein the strakes avoid swirling of the oil as the oil flows towards the oil drain.

9. The shaft lubrication system of claim 8, wherein a strake plane is formed by, at least, two points on a center axis of the turbocharger and a point proximate to the oil drain and wherein the one or more strakes include at least one of a first strake extending in a general direction of the strake plane, an angled strake extending at an angle, with respect to the strake plane, and a curved strake.

* * * * *